US008866047B1

(12) United States Patent
Parker

(10) Patent No.: US 8,866,047 B1
(45) Date of Patent: Oct. 21, 2014

(54) REMOVABLE TIMED WINDSHIELD DEICER SHEET

(76) Inventor: Darren Parker, Blue Eye, MO (US)

( * ) Notice: Subject to any disclaimer, the term of this patent is extended or adjusted under 35 U.S.C. 154(b) by 780 days.

(21) Appl. No.: 12/709,467

(22) Filed: Feb. 20, 2010

(51) Int. Cl.
*B60L 1/02* (2006.01)

(52) U.S. Cl.
USPC ............. 219/203; 219/492; 219/219; 701/36; 701/31.4; 320/109

(58) Field of Classification Search
USPC ............. 257/203; 219/203, 492, 219; 701/36, 701/31.4; 320/109
See application file for complete search history.

(56) References Cited

U.S. PATENT DOCUMENTS

| | | | | | |
|---|---|---|---|---|---|
| 4,701,594 | A * | 10/1987 | Powell | ........................ | 219/219 |
| 4,965,432 | A * | 10/1990 | Harris | ........................ | 219/203 |
| 5,025,130 | A * | 6/1991 | Slone | ........................ | 219/203 |
| 5,160,827 | A * | 11/1992 | Parker | ........................ | 219/203 |
| 5,650,080 | A * | 7/1997 | Koneke | ........................ | 219/203 |
| 6,037,573 | A * | 3/2000 | Arsenault et al. | ............. | 219/492 |
| 2006/0011596 | A1* | 1/2006 | Sharp et al. | ................... | 219/203 |
| 2011/0082615 | A1* | 4/2011 | Small et al. | ..................... | 701/29 |
| 2011/0215078 | A1* | 9/2011 | Williams | ...................... | 219/203 |

* cited by examiner

*Primary Examiner* — Fernando L Toledo
*Assistant Examiner* — Mohammed Shamsuzzaman
(74) *Attorney, Agent, or Firm* — Michael I. Kroll

(57) ABSTRACT

A thermoelectric deicer sheet comprising a flexible sheet fabricated of static cling vinyl embedded with heater elements with a cord extending therefrom with a 12 volt adapter to plug into a vehicle's cigarette lighter and a user control unit having a means to set the temperature, time of initiation and duration of activity thereof. The sheet is applied to the interior surface of the windshield by applying pressure thereagainst to form a static bond therebetween and is peeled off when operation is complete.

6 Claims, 9 Drawing Sheets

REMOVABLE TIMED WINDSHIELD DEICER SHEET

BACKGROUND OF THE INVENTION

1. Field of the Invention

The present invention relates generally to windshield defrosters and, more specifically to a flexible sheet of static cling vinyl embedded with at least one heating element that is applied to the interior surface of a windshield to deice it. A control unit is provided to set the time to initiate deicing, the duration and the temperature. The device receives power from a 12 volt adapter that plugs into the cigarette lighter.

Deicers known in the prior art usually require the user to scrape the ice off of the windshield manually or to start the vehicle and wait for it to warm up and then set the defroster on full blast. These are time consuming and uncomfortable for the user. The present invention enables the user to apply the sheet to the windshield prior to use and set the device to deice prior to going to the vehicle. For instance, if the driver knows they will be leaving for work at 8 am, they would apply the static cling sheet to the windshield, se the temperature and set it to start deicing at 7:45 am for 15 minutes. By the time they left the house at 8 am the windshield would be free of ice and all they would have to do is unplug the adapter and remove the sheet from the windshield.

2. Description of the Prior Art

There are other windshield deicers designed for a similar purpose. While these deicers may be suitable for the purposes for which they were designed, they would not be as suitable for the purposes of the present invention, as hereinafter described.

SUMMARY OF THE PRESENT INVENTION

A primary object of the present invention is to provide a removable, timed deicer sheet for deicing the windshield of a vehicle.

Another object of the present invention is to provide a flexible sheet embedded with at least one heater element for application to the interior surface of a vehicle.

Yet another object of the present invention is to provide a flexible deicer sheet fabricated of static cling vinyl that will adhere to the interior surface of a vehicle by touch and is removed therefrom by simply pulling it off.

Still yet another object of the present invention is to provide a flexible deicer sheet that includes a cord terminating at a 12 volt adapter to plug into the vehicle's cigarette lighter to supply power to the heater element.

Another object of the present invention is to provide a flexible deicer sheet having a control unit in line with the cord having a timer and control buttons to enable the user to set the time to activate deicing and the duration it is to remain active.

Yet another object of the present invention is to provide a flexible deicer sheet wherein the control unit further includes a rheostat and user control buttons for adjusting the desired temperature for deicing.

Still another object of the present invention is to provide a flexible deicer sheet that may be transparent, colored or have a decorative pattern to enhance the aesthetic properties thereof.

Yet another object of the present invention is to provide a flexible deicer sheet wherein the cord may be unplugged from the sheet for use with other alternate deicer elements.

Another object of the present invention is to provide a flexible deicer sheet wherein one alternate deicer element to receive the cord is a fan having a face guard comprised of heating elements.

Still another object of the present invention is to provide a flexible deicer sheet that is inexpensive to manufacture and operate.

Another object of the present invention is to provide a flexible deicer sheet that is simple and easy to use.

Additional objects of the present invention will appear as the description proceeds.

The present invention overcomes the shortcomings of the prior art by providing a thermoelectric deicer sheet comprising a flexible sheet fabricated of static cling vinyl embedded with heater elements with a cord extending therefrom with a 12 volt adapter to plug into a vehicle's cigarette lighter and a user control unit having a means to set the temperature, time of initiation and duration of activity thereof. The sheet is applied to the interior surface of the windshield by applying pressure thereagainst to form a static bond therebetween and is peeled off when operation is complete.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
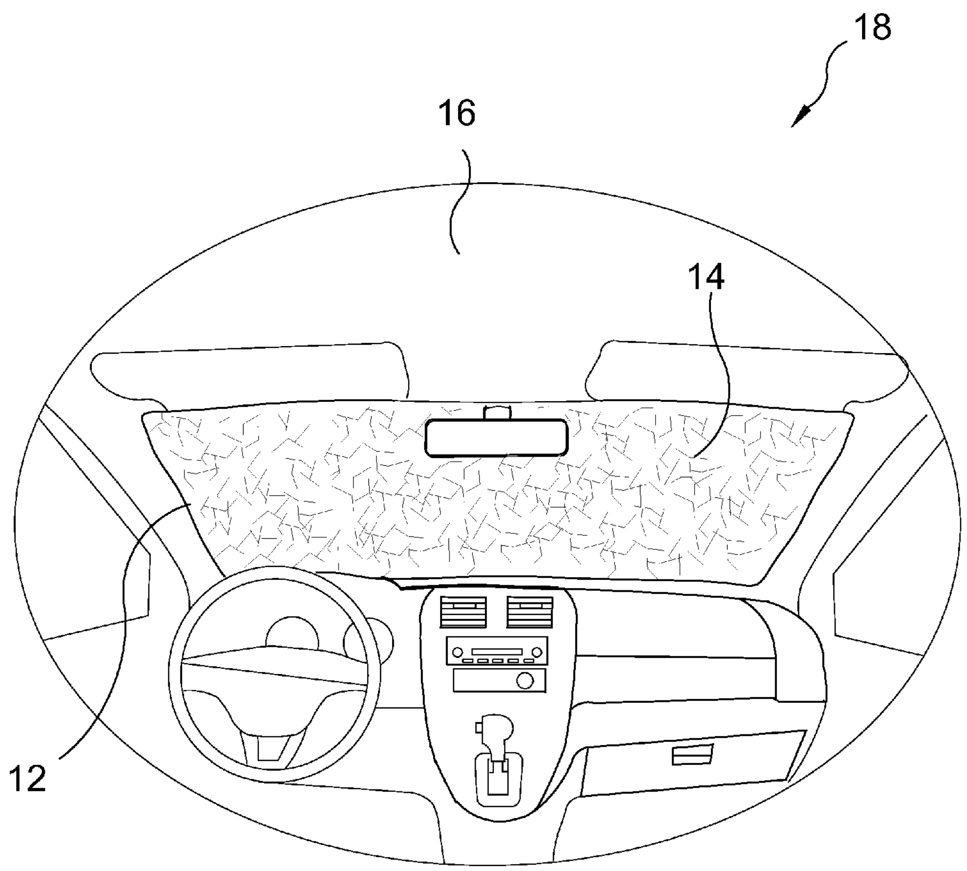
FIG. 1 is an illustrative view of the prior art.

Turning now descriptively to the drawings, in which similar reference characters denote similar elements throughout the several views, the figures illustrate the Removable Timed Windshield Deicer Sheet of the present invention. With regard to the reference numerals used, the following numbering is used throughout the various drawing figures.

10 Removable Timed Windshield Deicer Sheet of the present invention
12 windshield
14 ice
16 vehicle
18 prior art
20 flexible deicer sheet
22 static cling vinyl
24 heater element
26 cord
28 12 volt adapter
30 control unit
32 user control button
34 digital display screen
36 cigarette lighter socket
38 rheostat
40 timer
42 battery
44 memory
46 microprocessor
48 plug of 26
50 socket for 48
52 thermoelectric fan
54 stand

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the prior art 18. Shown is a vehicle 16 with a windshield 12 caked in ice 14. Ordinarily deicing requires manually scraping off the ice 14 or waiting for the vehicle 16 to warm up and running the defroster on high which is time consuming and a hassle. The present invention enables the user to deice prior to approaching the vehicle 16.

Figure 2:
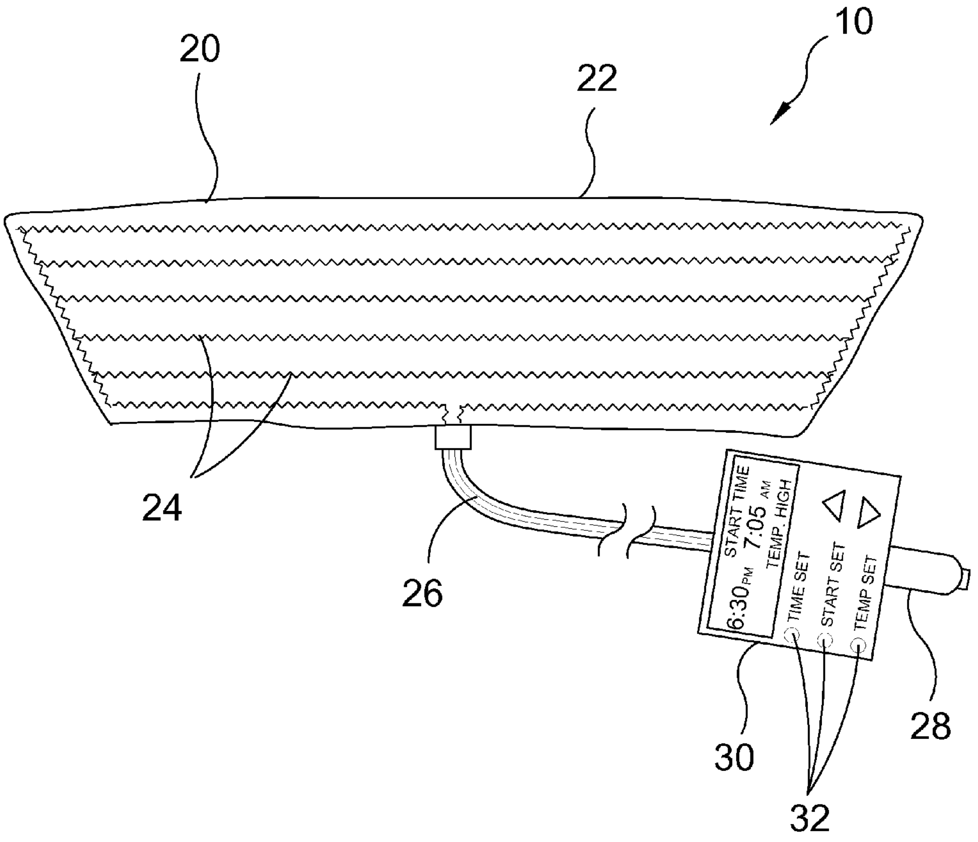
FIG. 2 is a front view of the present invention.

FIG. 2 is a front view of the present invention 10. Shown is the flexible sheet 20 manufactured with static cling vinyl 22 and embedded with a heater element 24. The heater element 24 could assume a variety of configurations and the one shown is for illustrative purposes. A cord 26 with a 12 volt adapter 28 disposed on its distal end provides power when plugged in the lighter socket of a vehicle. A control unit 30 is in line with the cord 26 and is shown here transitioning between the cord 26 and the 12 volt adapter 28. The control unit 30 has a timer and user control buttons 32 to enable the user to preset the time of activation of the heater elements 24 and the duration thereof. Optionally, a rheostat may be included therein to adjust the temperature emitted by the heater elements 24 during activation.

Figure 3:
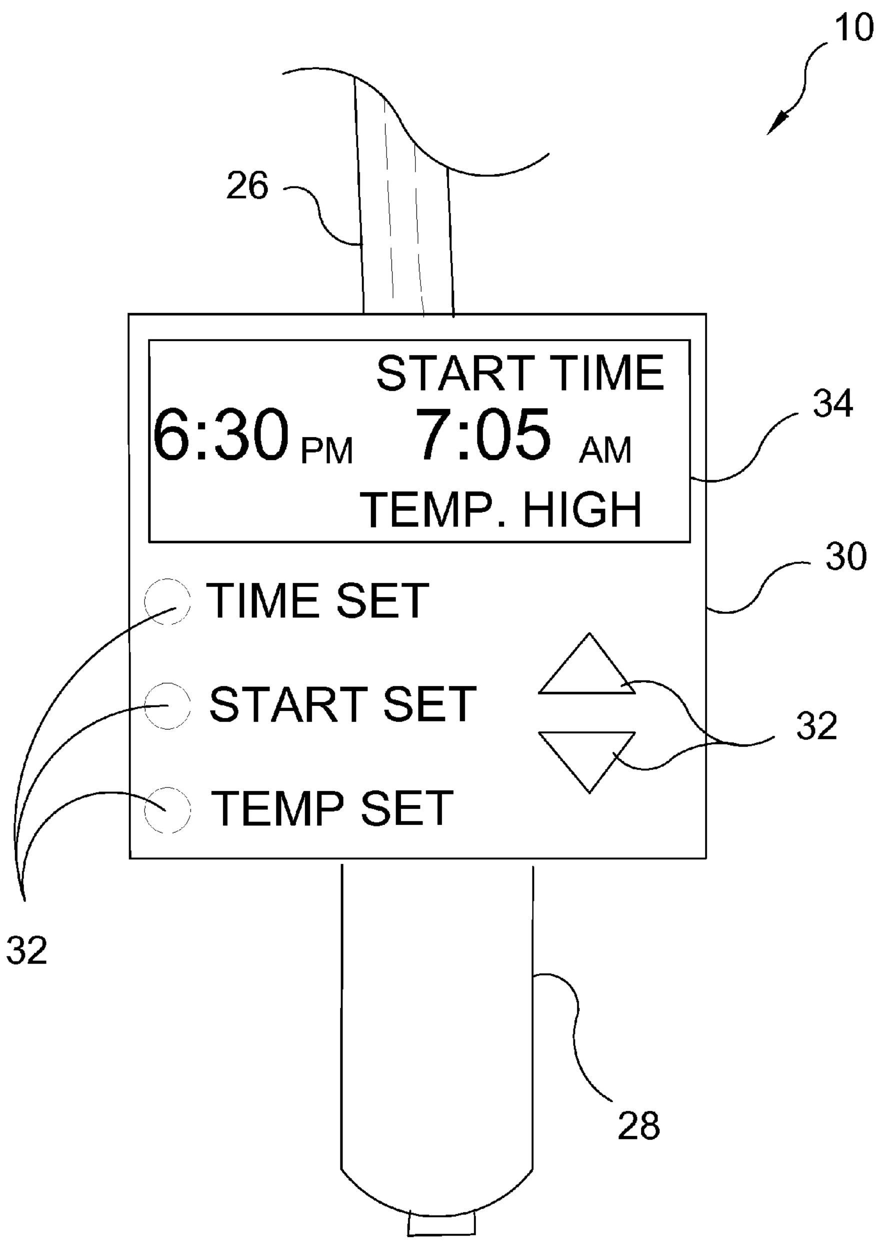
FIG. 3 is a front view of the control unit.

FIG. 3 is a front view of the control unit 30 of the present invention 10. Shown is one possible configuration of the control unit 30 having a plurality of user control buttons 32 and a display screen 34. The control unit 30 may be situated anywhere along the cord 26 but is illustrated here transitioning between the cord 26 and the 12 volt adapter 28.

Figure 4:
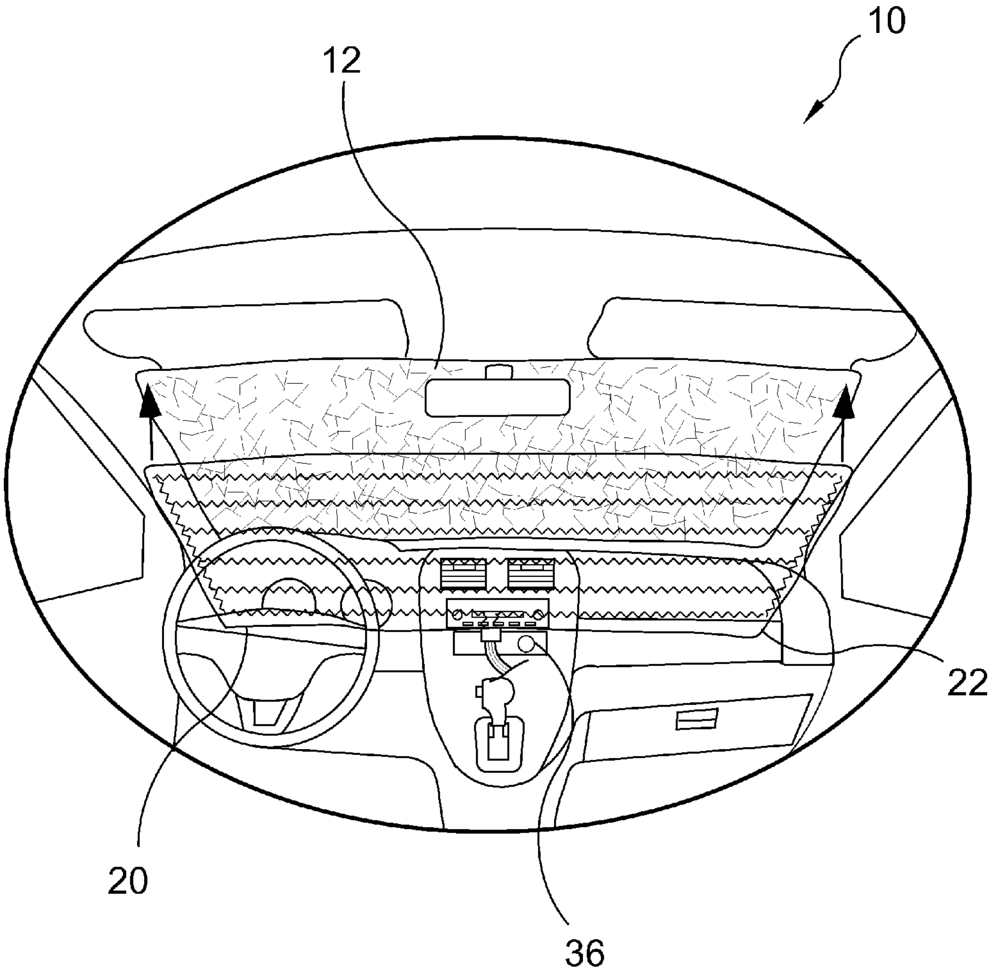
FIG. 4 is an illustrative view of the present invention being installed.

FIG. 4 is an illustrative view of the present invention 10 being installed. The flexible sheet 20 is being placed onto the windshield 12 and just has to be pressed thereon due to the properties of the static cling vinyl 22 it is fabricated of. The 12 volt adapter 28 will then be inserted into the cigarette lighter socket 36.

Figure 5:
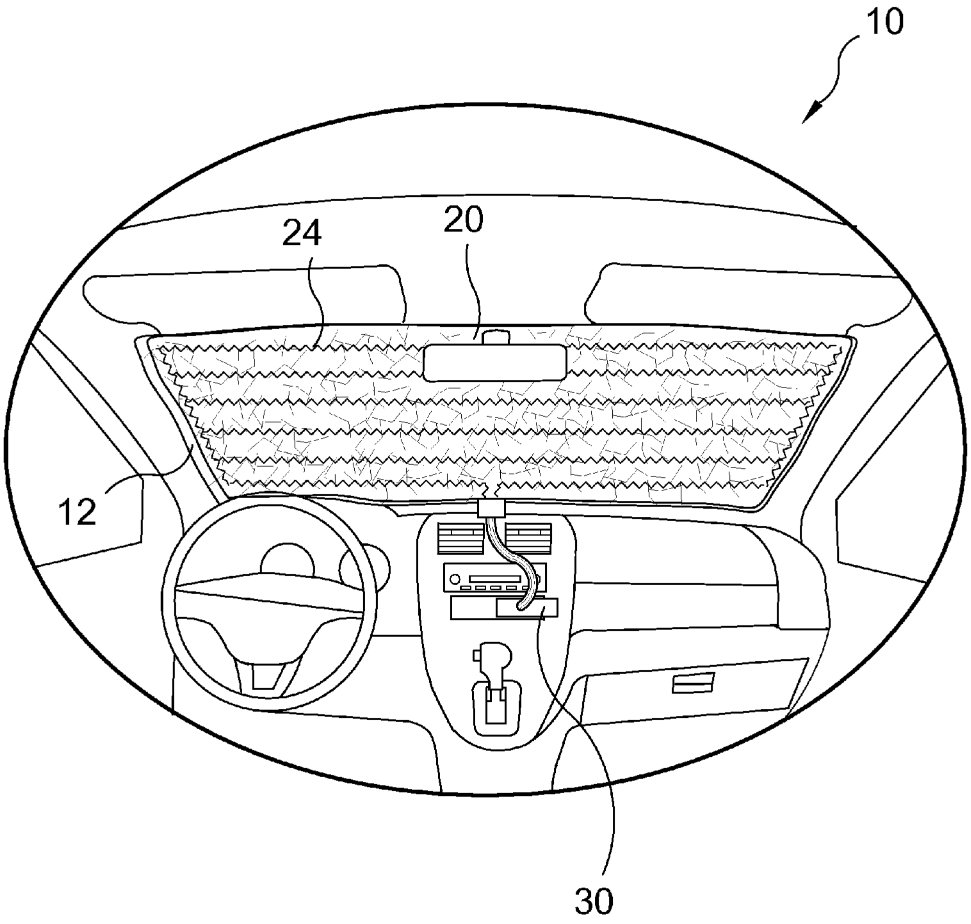
FIG. 5 is an illustrated view of the present invention installed

FIG. 5 is an illustrated view of the present invention 10 installed. Shown is the flexible sheet 20 and associated heater elements 24 installed on the windshield 12 and the control unit 30 and affiliated 12 volt adapter inserted into the cigarette lighter socket 36.

Figure 6:
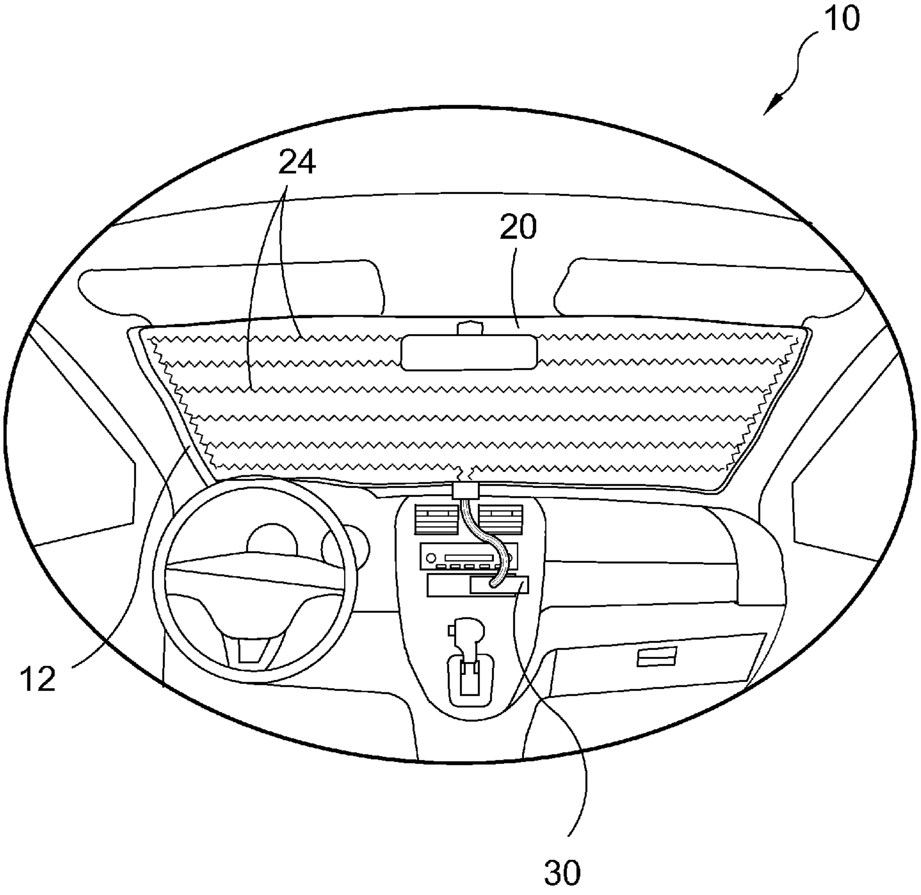
FIG. 6 is an illustrative view of the present invention in use.

FIG. 6 is an illustrative view of the present invention 10 in use. Shown is the flexible sheet 20 engaged with the windshield 12 and the heater elements 24 activated according to settings of the control unit 30 with the ice that was on the windshield 12 melted.

Figure 7:
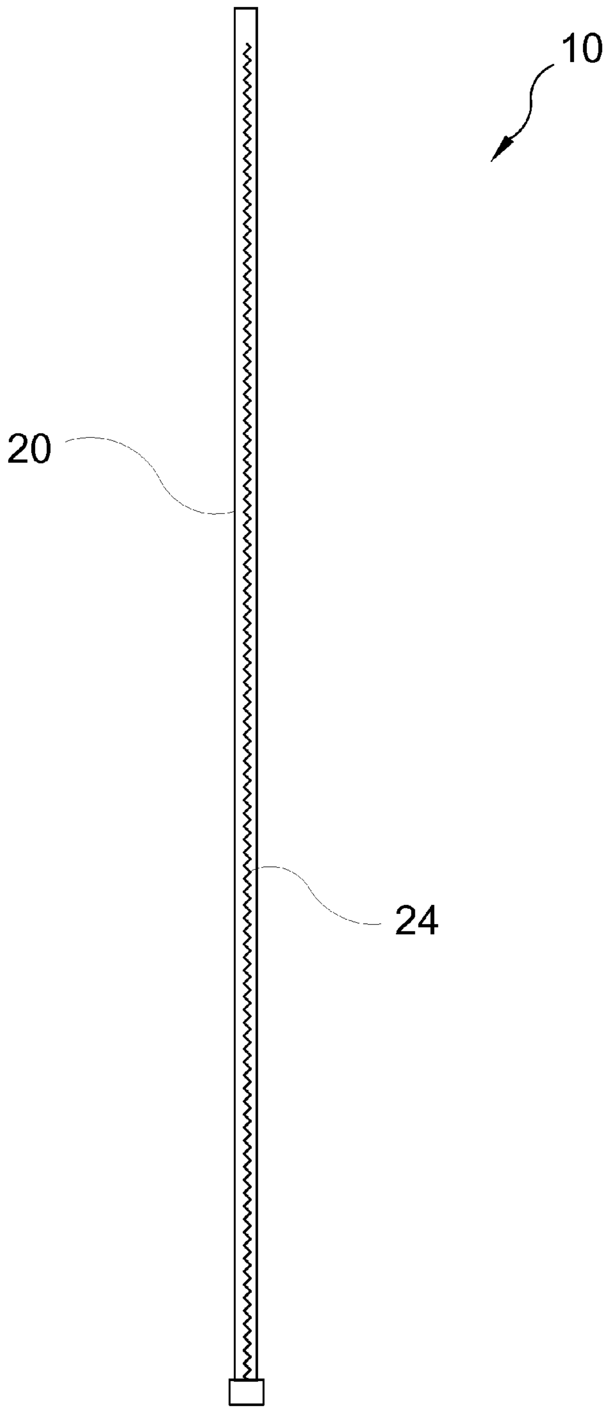
FIG. 7 is a side view of the flexible deicer sheet of the present invention.

FIG. 7 is a side view of the flexible deicer sheet of the present invention 10. Shown is the flexible sheet 20 and the embedded heater elements 24.

Figure 8:
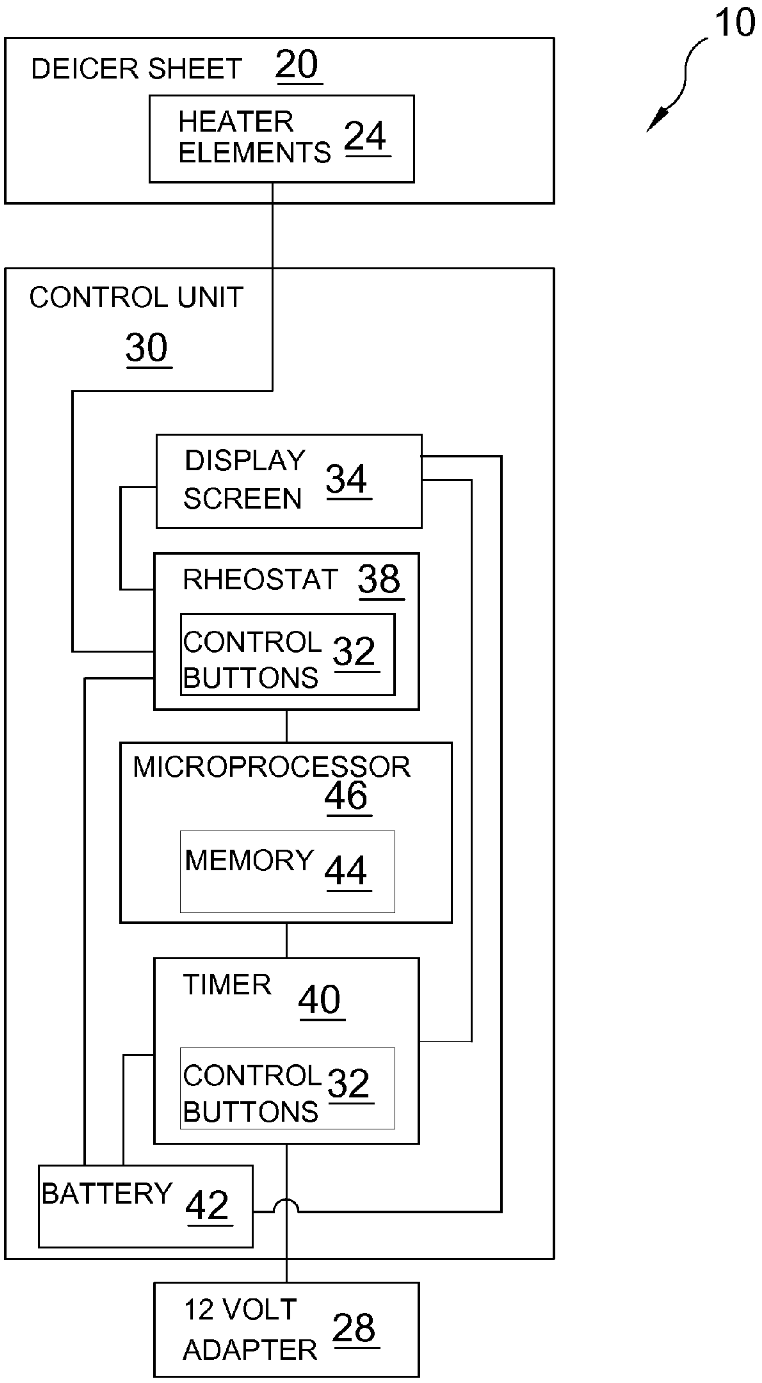
FIG. 8 is a block diagram of the present invention.

FIG. 8 is a block diagram of the present invention 10. Shown is the control unit 30 comprising a digital display screen 34, memory 44, a rheostat 38, a timer 40 and a plurality of user control buttons 32. A battery 42 is included to maintain the time and allow the user to adjust the settings without plugging in the adapter 28. The control unit 30 is in communication with the heater elements 24 embedded in the flexible sheet 20 and with the 12 volt adapter 28.

Figure 9:
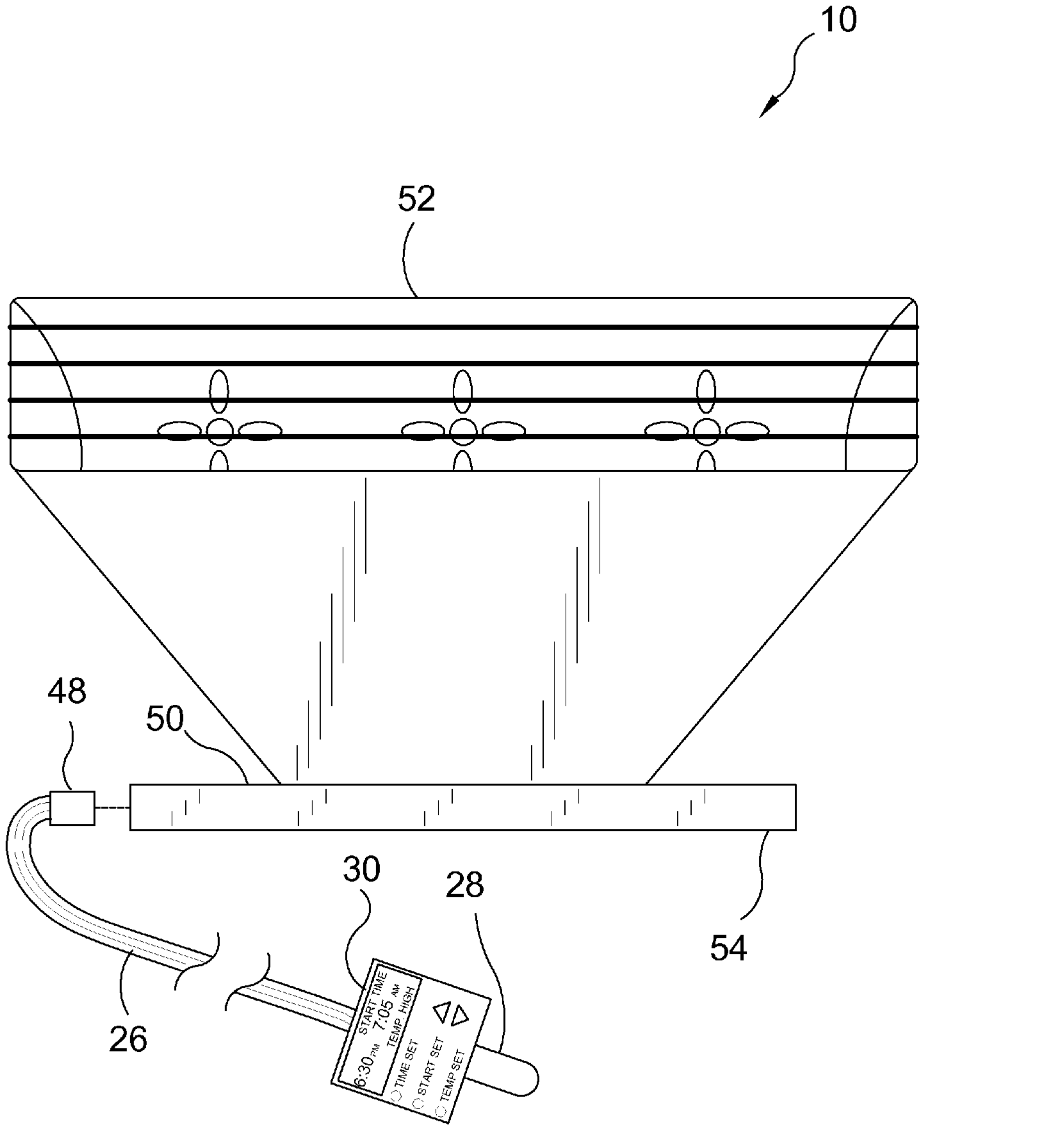
FIG. 9 is a front view of the thermoelectric fan of the present invention.

FIG. 9 is a front view of an alternate element of the present invention 10. Shown is the cord 26 having a plug 48 insertable to a mating socket 50 on a thermo-electric fan 52 have stand 54 with control unit 30 and 12 volt adapter 28 are to be employed therewith.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letter Patent is set forth in the appended claims:

1. A removable, timed windshield deicer sheet consisting of:

a) a static cling, flexible vinyl deicer sheet embedded with at least one heater element, said deicer sheet adapted to cling to an inner surface of a windshield substantially filling up an entire area of the windshield by applying a pressure thereagainst to form a static bond therebetween and is removed by pulling it off;

b) a cord extending from said flexible sheet terminating with a 12 volt adapter to plug into a vehicle's cigarette lighter socket to energize said at least one heater element, said cord having a removable plug for connecting to said flexible sheet allowing said cord to be unplugged from said sheet;

and c) a control unit mounted on said cord having a timer and user control buttons to enable the user to preset the time that said at least one heater element is energized and the duration thereof, a digital display screen, and a battery for allowing said control buttons on said control unit to be set prior to plugging said cord into said cigarette lighter socket; and d) said control unit comprising said digital display screen showing start time, temperature setting, user control buttons for time set, start set, and temperature set, and up and down user control buttons.

2. The removable, timed windshield deicer sheet according to claim 1, wherein said sheet is applied to the interior surface of said windshield.

3. The removable, timed windshield deicer sheet according to claim 2, wherein said battery also enables said timer to keep time when the adapter is not in use and to enable said digital display screen when said cord is not plugged into said cigarette lighter.

4. The removable, timed windshield deicer sheet according to claim 3, wherein said control unit further comprises a rheostat to enable the user to set the temperature emitted by said energized heater elements.

5. The removable, timed windshield deicer sheet according to claim 4, wherein said control unit includes a microprocessor with memory for storing the settings of said rheostat and said timer.

6. The removable, timed windshield deicer sheet according to claim 5, wherein said flexible deicer sheet has aesthetic qualities taken from the group: transparent, colored and decorative pattern.

* * * * *